Figure 1:
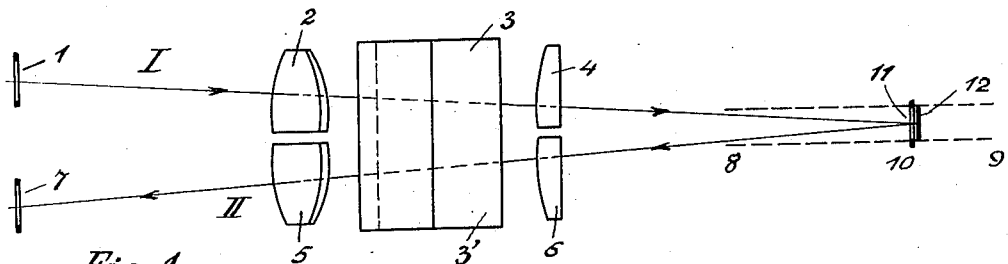

Inventor:
Carl Müller
by Franz Reichod
Attorney.

Sept. 3, 1929.  C. MÜLLER  1,727,173
SYSTEM FOR SELECTING RAYS OF DIFFERENT WAVE LENGTHS
FROM A SOURCE THEREOF
Filed Sept. 30, 1927  9 Sheets-Sheet 2
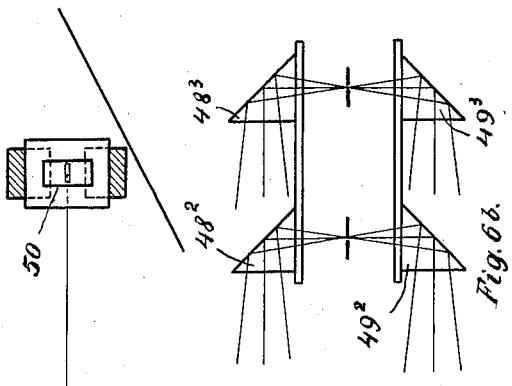
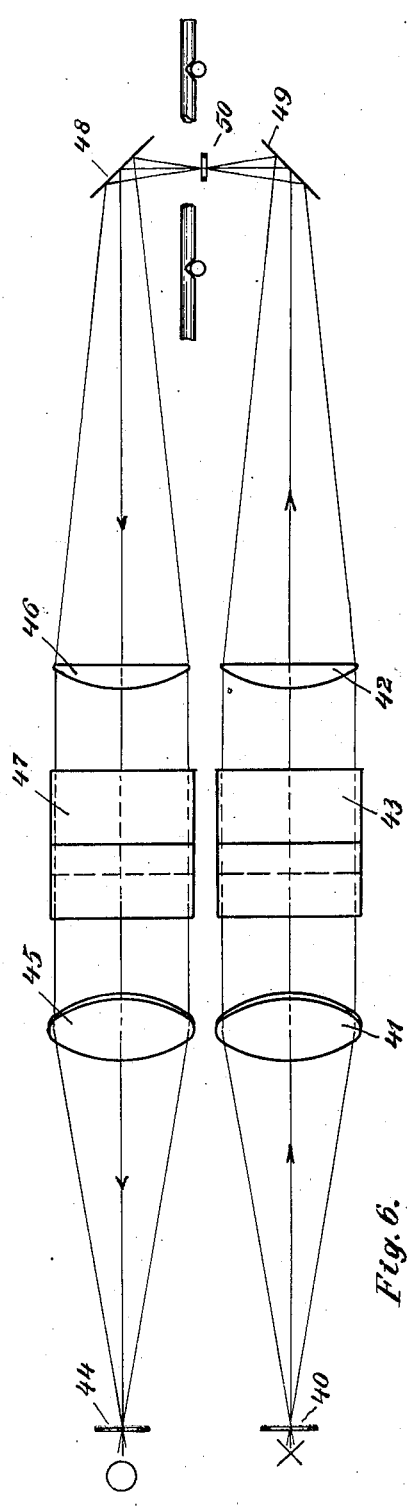
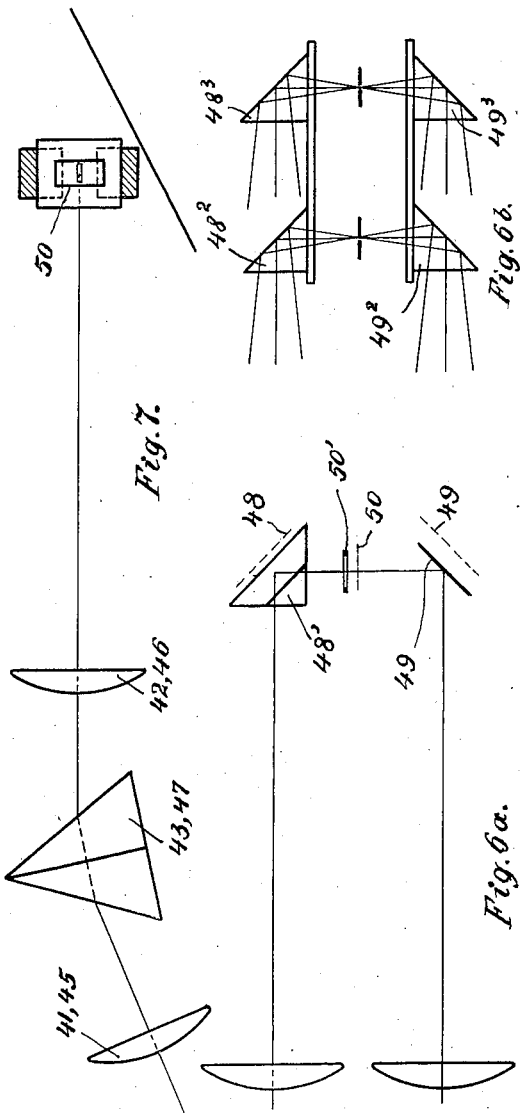

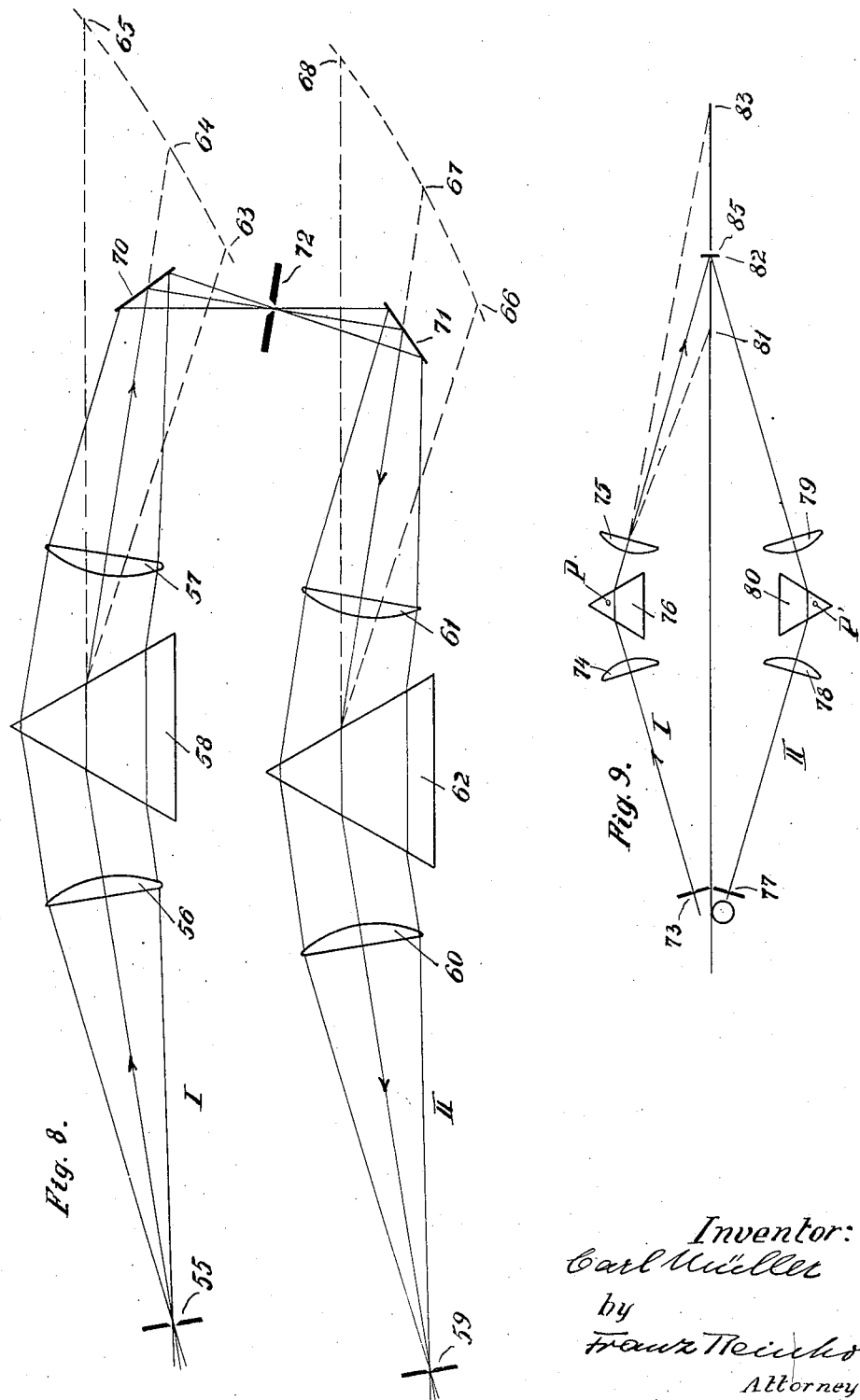

Sept. 3, 1929. C. MÜLLER 1,727,173
SYSTEM FOR SELECTING RAYS OF DIFFERENT WAVE LENGTHS
FROM A SOURCE THEREOF
Filed Sept. 30, 1927 9 Sheets-Sheet 4
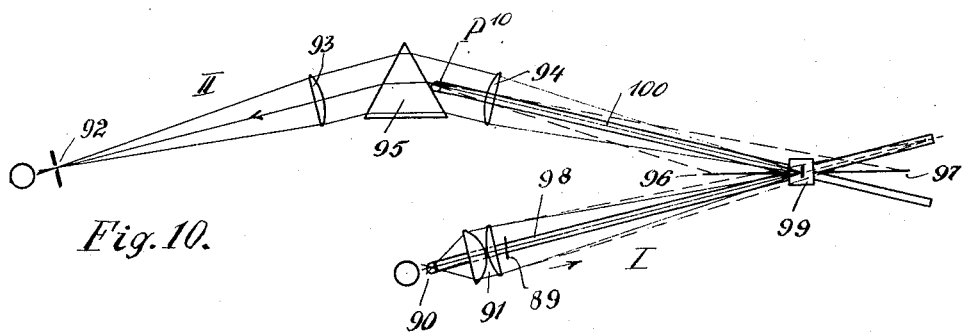
Fig. 10.
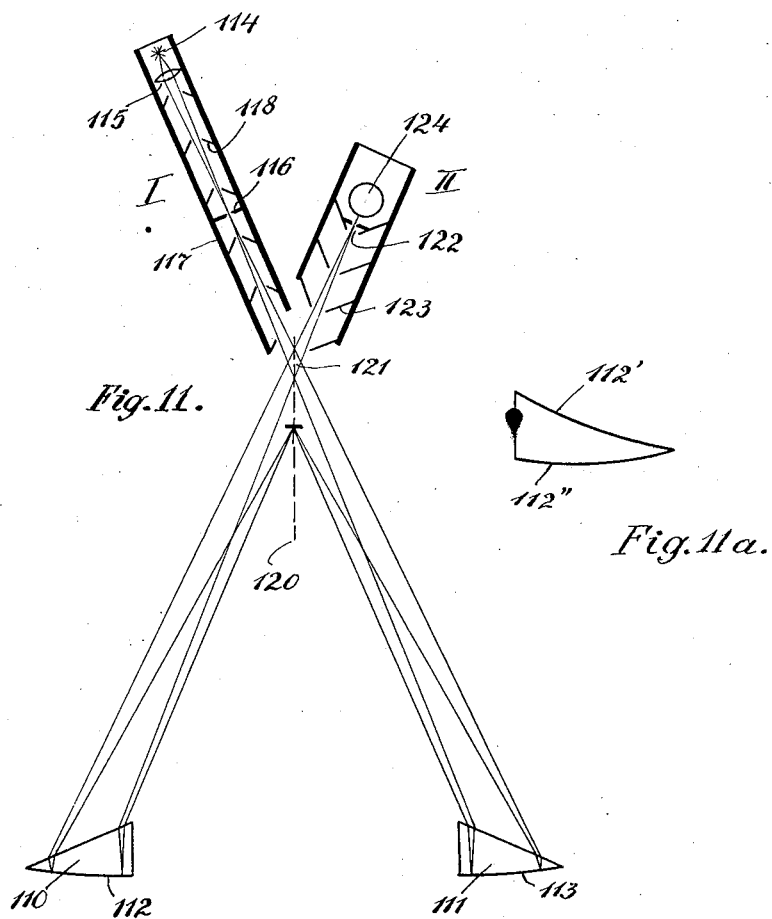
Fig. 11.
Fig. 11a.
Inventor:
Carl Müller
by Frank Neuköld
Attorney.

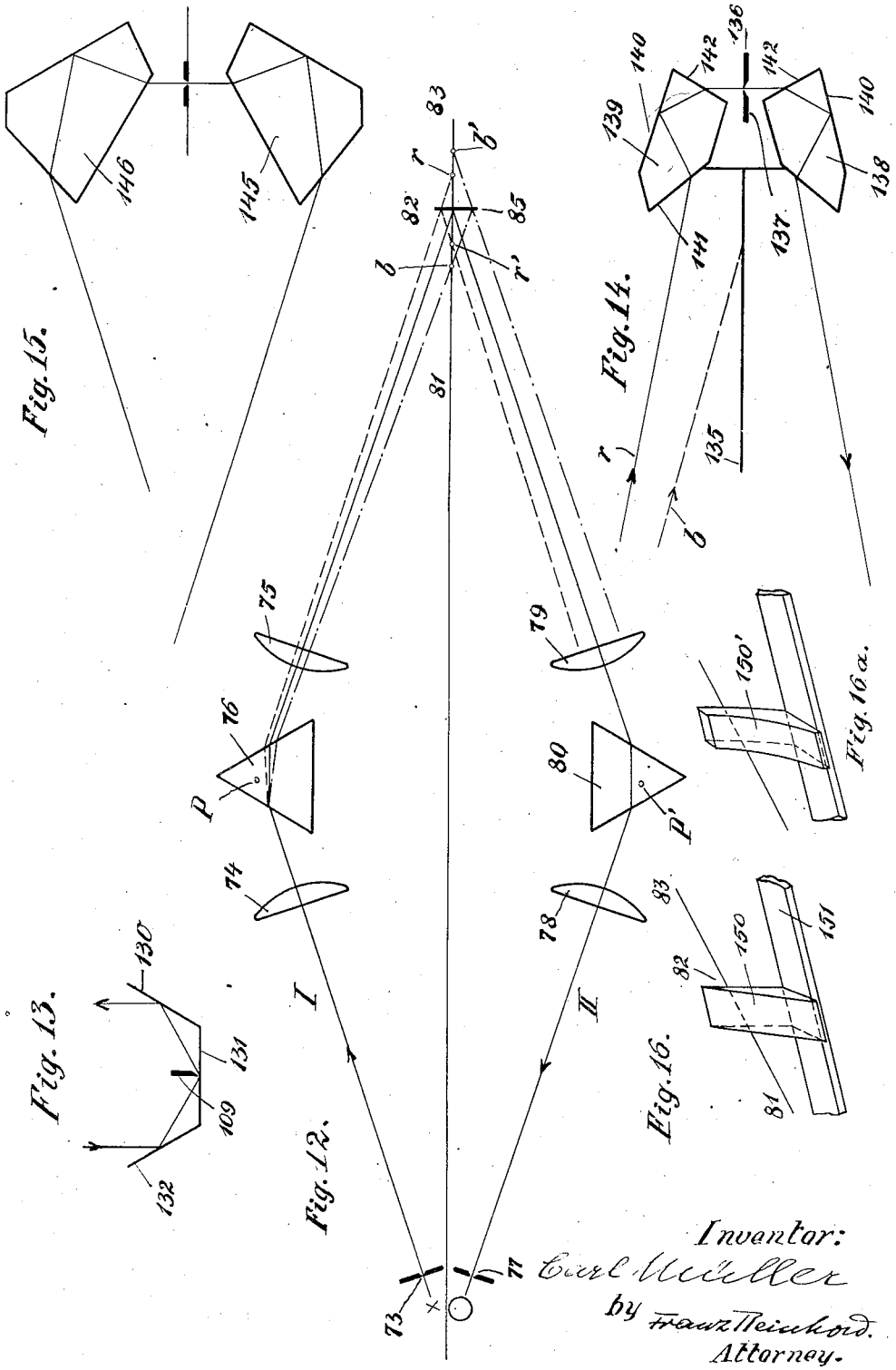

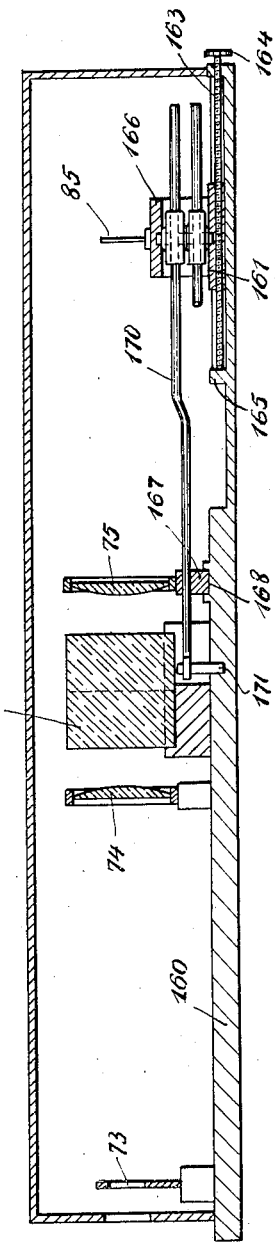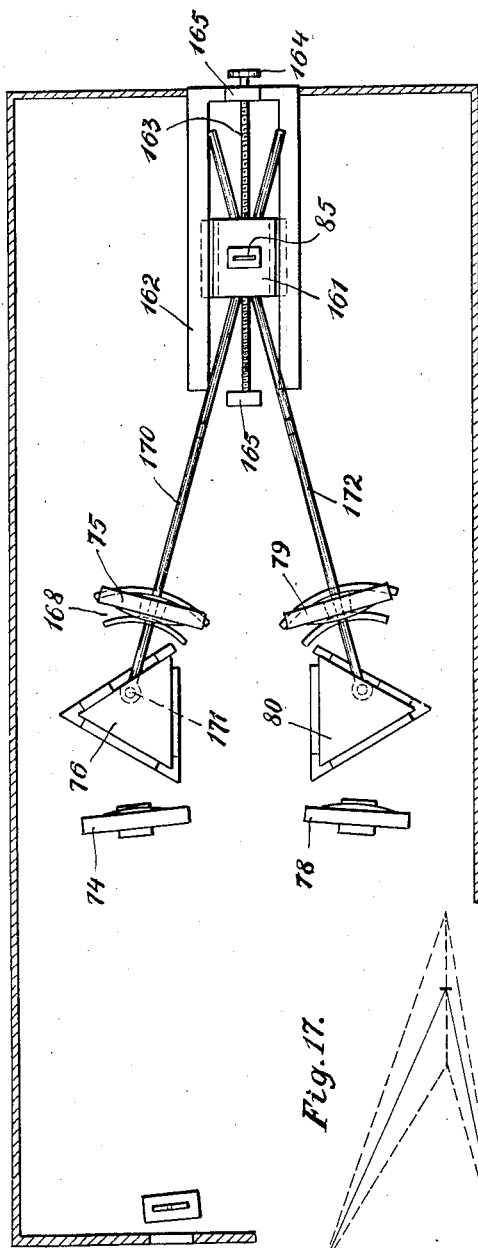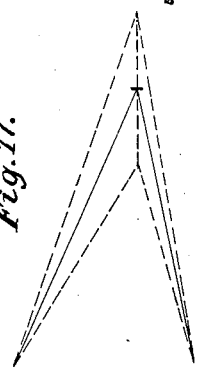

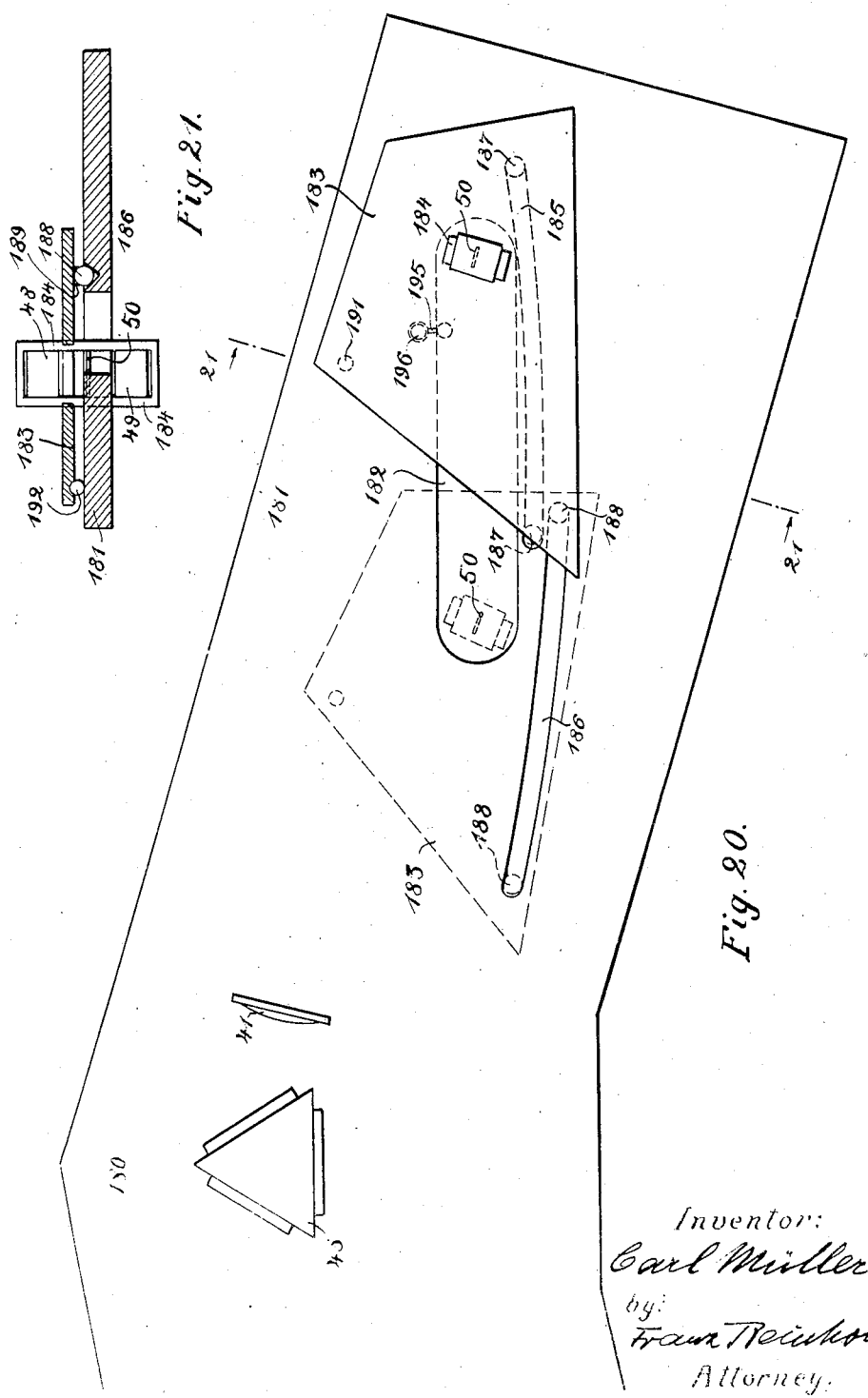

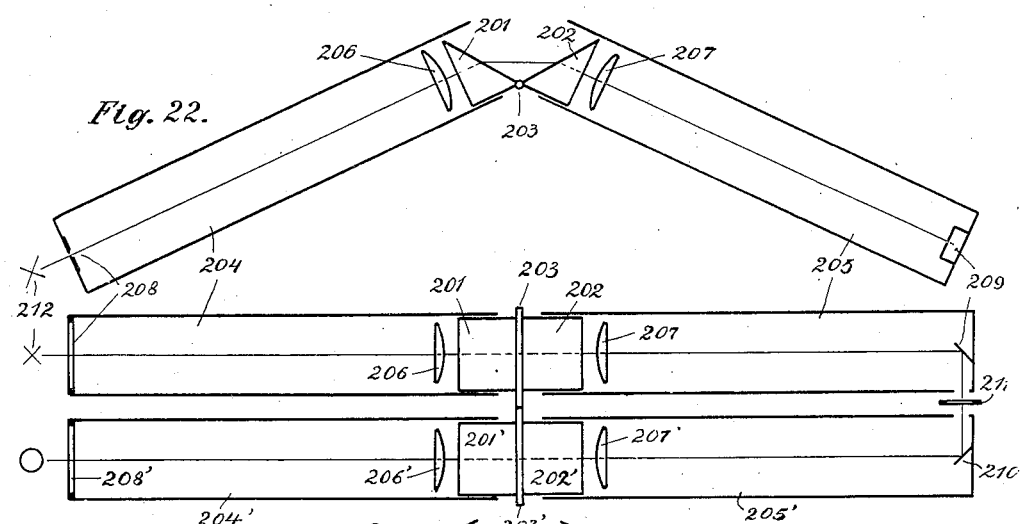
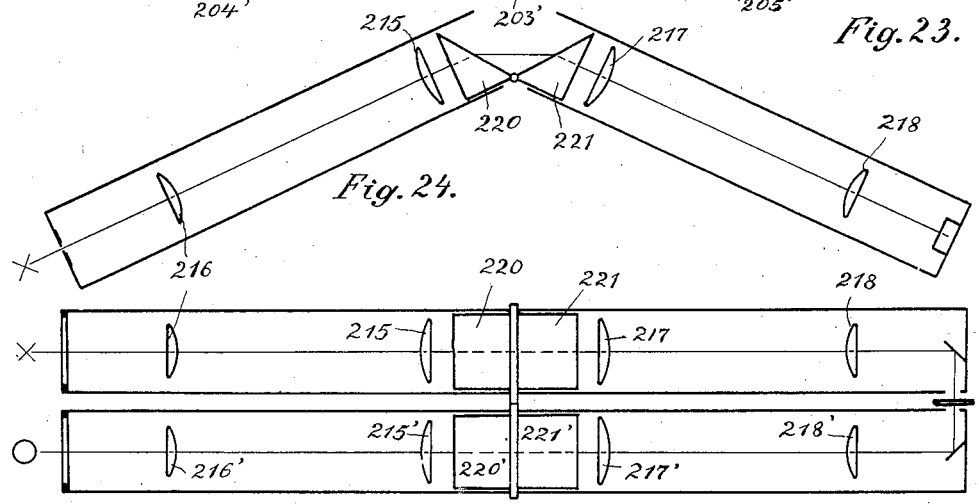
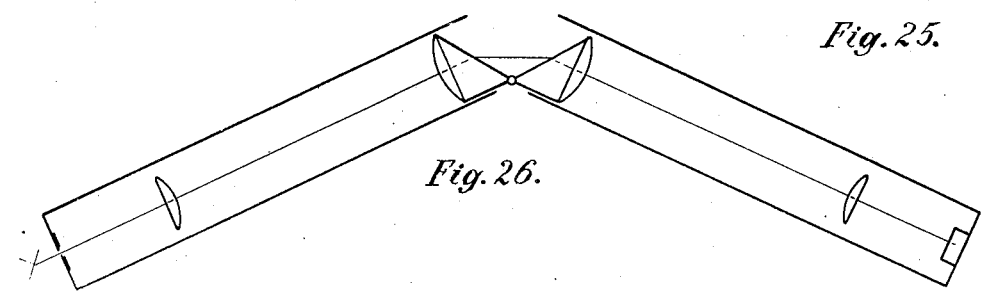

Sept. 3, 1929.  C. MÜLLER  1,727,173
SYSTEM FOR SELECTING RAYS OF DIFFERENT WAVE LENGTHS
FROM A SOURCE THEREOF
Filed Sept. 30, 1927  9 Sheets-Sheet 9

Inventor:
Carl Müller
by Franz Reichow
Attorney.

Patented Sept. 3, 1929.

1,727,173

UNITED STATES PATENT OFFICE.

CARL MÜLLER, OF CHARLOTTENBURG, GERMANY.

SYSTEM FOR SELECTING RAYS OF DIFFERENT WAVE LENGTHS FROM A SOURCE THEREOF.

Application filed September 30, 1927, Serial No. 223,202, and in Germany February 17, 1925.

I have filed applications on this invention in Germany, February 17 and April 6, 1925.

My invention relates to improvements in systems for selecting rays of different wave lengths from a source thereof, and more particularly in systems of the class comprising a plurality of apparatus adapted to be successively traversed by the rays and one forming the spectrum of the rays and the other one purifying rays selected from the said spectrum. Systems of this type are used for various purposes in which it is essential that the pencil of rays selected from the source thereof is perfectly pure and contains only rays of the desired wave length. As is known to those skilled in the art, when forming a spectrum of the rays emitted from a source thereof and passing through a single spectroscope or the like, the colors of the spectrum are never pure, and they contain foreign colors thrown thereon by dispersion, reflection and other irregularities, and the said foreign colors admixed to the selected colors impair the accuracy of the measurements. By first forming the spectrum from the pencil of rays, and thereafter purifying the said pencil by again passing the same through a spectroscope, spectrograph or the like, the said foreign rays are practically eliminated, so that the selected pencil of rays contains only rays of the desired wave length.

If pencils of rays of different wave lengths are to be successively selected from the spectrum the systems heretofore in use are objectionable for the reason that the second spectroscope or similar apparatus by means of which the selected pencil of rays is purified must be moved relatively to the first apparatus through a large angle, according to the position of the portion of the spectrum to be selected. One of the objects of the improvements is to provide a system in which the operation of selecting different parts of the spectrum is comparatively simple, the system being constructed so that the main parts of both apparatus of the system are stationary, and that only a comparatively small element common to both apparatus need be moved through a comparatively simple line for selecting the desired portion of the spectrum, and with this object in view my invention consists in disposing the said two apparatus of the system one beside the other and so that the foci in which the rays of similar wave lengths coming from the first apparatus meet, coincide substantially with the foci of the second apparatus from which the same rays are transmitted to the eye piece of the said second apparatus.

Systems of the type referred to are used for example in apparatus for testing the permeability to light of transparent bodies, in which rays of different wave lengths are successively subjected to the test. Further, they are used in polarization apparatus for determining polarization of rays of different wave lengths. Another example of the use of the system are apparatus for testing fluorescence. In all of these cases it is essential that the pencil of rays used in the investigation be absolutely pure.

Other objects of the improvements will appear from the following description of the invention.

Figure 2:
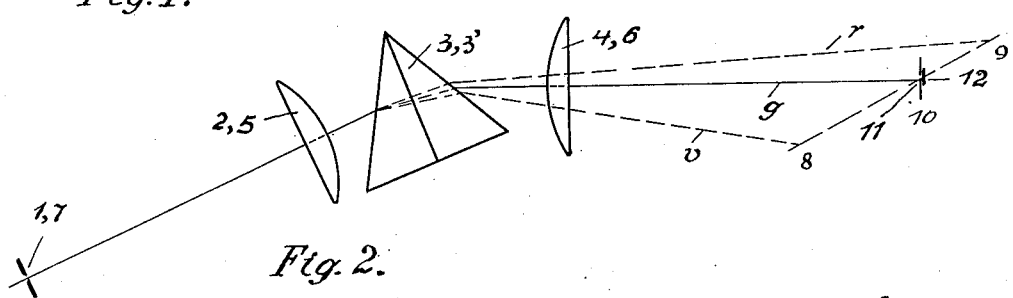
Figure 3:
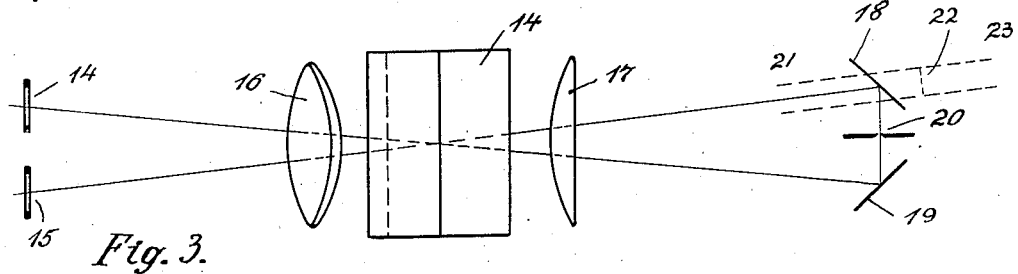
Figure 4:
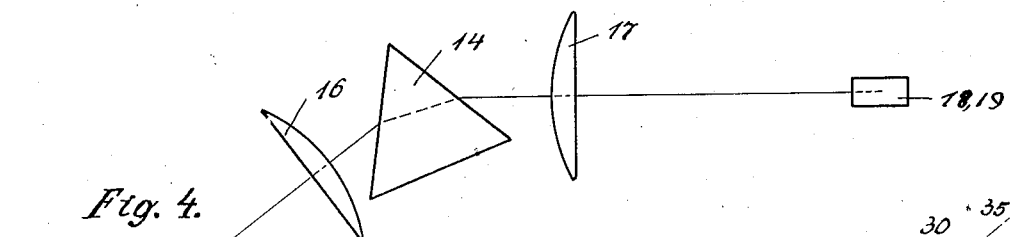
Figure 5:
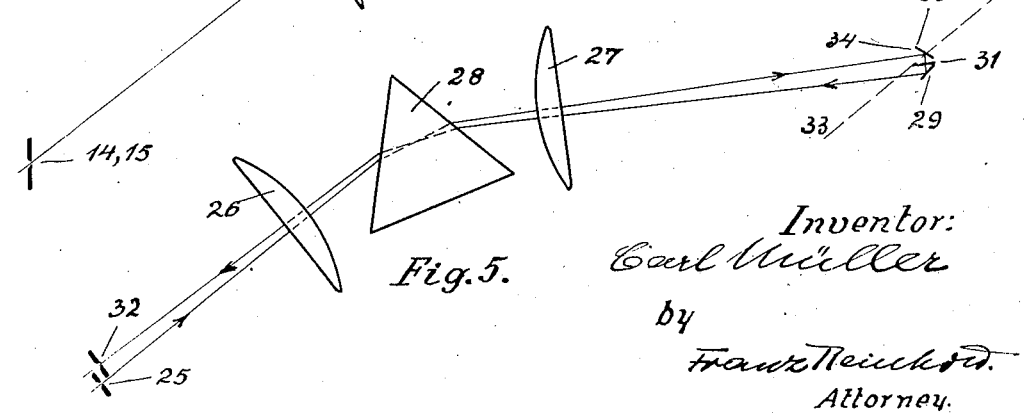
Figure 27:
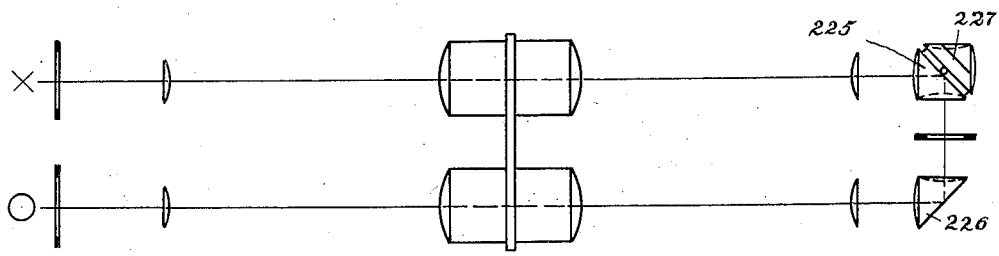
Figure 28:
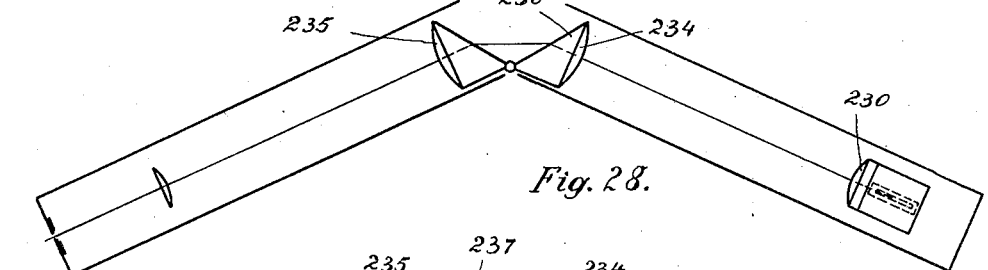
Figure 29:
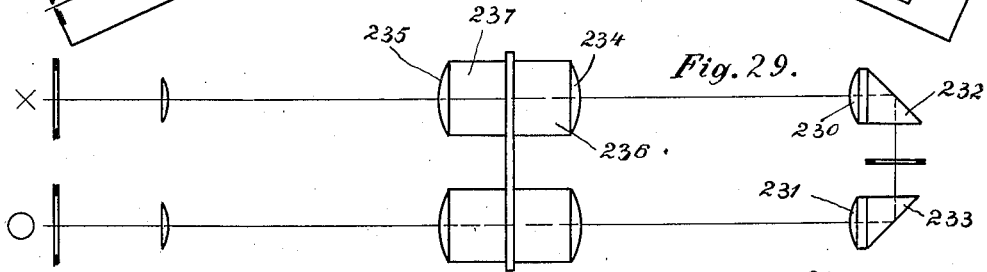
Figure 30:
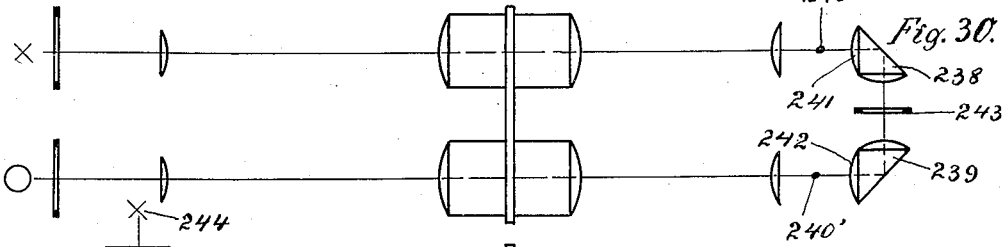
Figure 31:
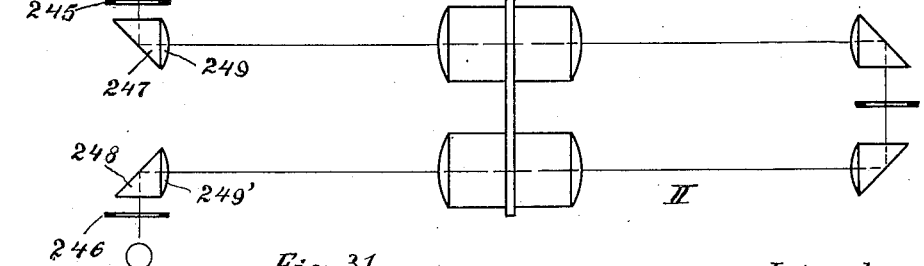

For the purpose of explaining the invention several examples embodying the same have been shown in the accompanying drawings, in which Fig. 1 is an elevation showing a system comprising a mirror common to both apparatus, Fig. 2 is a top plan view of Fig. 1, Fig. 3 is an elevation showing a modification comprising a pair of mirrors for directing the rays from one apparatus to the other one, and a selecting slot provided between the said mirrors, Fig. 4 is a top plan view of Fig. 3, Fig. 5 is a top plan view showing another modification, Fig. 6 is an elevation showing a system in which the dispersing prisms of both apparatus are located one above the other and two reflecting mirrors and a selecting slot are provided for directing the rays from the first apparatus to the second one, Fig. 6ª is a top plan view showing a part of the apparatus illustrated in Fig. 6, one of the reflecting mirrors being replaced by a reversing prism, Fig. 6ᵇ is a similar partial top plan view of the apparatus shown in Fig. 6, in which two reflecting and selecting systems are provided for selecting different portions of the spectrum, Fig. 7 is a top plan view of Fig. 6, Fig. 8 is a top plan view showing a modification in which two dispersing prisms are disposed one beside the other and with their edges parallel, Fig. 9 is a top plan view showing another modification of the system in which two apparatus are disposed symmetrically one beside the other, Fig. 10 is a top plan view showing a modification in which one of the apparatus of the system comprises non-achromatic lenses for dispersing the pencil of rays, Fig. 11 is a top plan view showing a modification in which the dispersing prisms are provided with reflecting concave rear faces, Fig. 11a is a plan view showing a Fery system adapted to be used in lieu of the prisms shown in Fig. 11, Fig. 12 is a top plan view of the system shown in Fig. 9 and illustrating the paths of the rays, Fig. 13 is a plan view of a reflecting system comprising three reflecting faces and a selecting slot, Fig. 14 is a partial plan view of the system shown in Figs. 9 and 12 and showing prisms of a specific form for reflecting the rays, Fig. 15 is a partial plan view similar to the one shown in Fig. 14, and showing another arrangement of the said prisms, Figs. 16 and 16a are perspective detail views showing selecting mirrors of different forms, Fig. 17 is a diagrammatical plan view showing another modification of the system, Fig. 18 is a sectional elevation illustrating a practical embodiment of the system shown in Fig. 9, Fig. 19 is a top plan view of Fig. 18, Fig. 20 is a top plan view showing a practical embodiment of the system shown in Figs. 6 and 7, and Fig. 21 is a section taken on the line 21—21 of Fig. 20, Fig. 22 is a sectional plan view showing a system in which the spectroscopes or spectrographs are in the form of Young spectroscopes, Fig. 23 is an elevation showing the system illustrated in Fig. 22, Fig. 24 is a sectional plan view similar to the one shown in Fig. 22 and showing a modification of the Young spectroscope, Fig. 25 is an elevation of the system shown in Fig. 24, Fig. 26 is an elevation similar to the one shown in Fig. 25 and showing another modification, Fig. 27 is a diagrammatical elevation showing another modification, Fig. 28 is a plan view showing another modification, and Figs. 29 to 31 are diagrammatical elevations showing three other modifications.

In the example shown in Figs. 1 and 2 my improved system comprises two spectroscopes or spectrographs I and II placed symmetrically one beside the other, the first spectroscope consisting of a diaphragm having a collimating slot 1 and a lens 2, a dispersing member such as a prism 3, and a lens 4. The second part of the system comprises a lens 5, a dispersing member such as a prism 3', a lens 6 and a slot 7 through which the selected and purified pencil of rays is transmitted to the measuring instrument or the like. The prisms 3 and 3' may be glass prisms, or, preferably, crystal prisms such as quartz prisms according to the character of the pencil of rays to be tested, the figure showing a quartz prism. The lenses 2, 4, 5 and 6 may be achromatic combinations of lenses, they may be made from non-achromatic material such as glass, quartz, fluor spar, salt, sylvin, etc., but ordinarily I prefer non-achromatic quartz lenses, because thereby the spectrum is made more elongated, and quartz lenses permit the passage of ultra-violet rays.

The light admitted through the collimating slot 1 is dispersed by the prism 3, and a spectrum is produced which is located substantially on the line 8—10—9, the red rays $r$ reproducing the slot 1 at 9, the green rays $g$ at 10, and the violet rays $v$ at 8. By refraction of the rays by the non-achromatic lenses 2 and 4, the image of the slot produced by the violet rays $v$ is nearer the lens 4 than the image produced by the red rays $r$. In Fig. 2 the line 8—10—9 is shown as a straight line though it is ordinarily slightly curved. For selecting rays of the same wave length from the spectrum thus produced a diaphragm formed with a slot 11 is provded, and at the rear of the said slot there is a mirror 12. Preferably the slot 11 is adjustable in width. The said diaphragm and mirror are adapted to be set on the line 8—10—9 in any position for selecting the desired rays, and it is located so that the rays passing through the slot and impinging upon the mirror are reflected in a direction angularly of the incoming rays, so that the reflected rays pass through the lenses 5 and 6 and the prism 3'. When thus passing through the prism 3' the foreign rays are deflected from the selected rays, so that a pure pencil of rays passes through the slot 7 and to the instrument to be illuminated thereby.

In the figures the prisms 3 and 3' have been combined into a single prism.

By placing a sensitized plate into the line 8—9—10 spectrographic photographs can be taken.

In Figs. 3 and 4 I have shown a modification in which two reflecting surfaces 18 and 19 are provided for deflecting the rays coming from the first apparatus and directing the same to the second apparatus. Between the said reflecting surfaces there is a diaphragm formed with a slot 20. Assuming the mirror 18 to be omitted, the pencil of rays passing through the collimating slot 15, lenses 16 and 17 and the prism 14 produces a spectrum in the form of a stripe 21—22—23, the said stripe being inclined from the point 23 rearwardly and towards the prism 14. The rays emanating from the slot 15 and shown in the figure would be focussed in the point 22. The mirror 18 is located in front of the stripe 21—23 and it is adapted to be shifted parallel thereto so as to reflect the rays in lateral direction and through the slot 20, so that the focus 22 is located in the slot 20. By the said slot a narrow pencil of rays is selected which impinges upon the mirror 19 and is reflected thereby into a direction for passing through the lenses 17 and 16, the prism 14 and a slot 24. The mirrors 18 and 19 and the slot 20 are adapted to be shifted so that the mirror 18 can be set in position for reflecting any part of the spectrum 21—22—23 through the slot 20 and on the mirror 19.

In Figs. 3 and 4 I have shown a system in which the rays are reflected within planes disposed parallel to the edges of the prism. Fig. 5 shows a modification in which the said rays are reflected in planes perpendicular to the said edges. The apparatus comprises a collimating slot 25, a pair of lenses 26 and 27, a prism 28, reflecting surfaces 29 and 30, a slotted diaphragm 31, and a slot 32 in which the image of the slot 25 is produced. The spectrum produced by the rays passing through the slot 25 has been indicated by the line 33—34—35, and the selected portions of the said spectrum are reflected by the mirror 30 through the slot of the diaphragm 31. The mirrors 29 and 30 and the diaphragm 31 are adapted to be shifted so that the mirror 30 is able to reflect the desired portion of the spectrum.

In Figs. 6 and 7 I have shown a system which is similar to the one illustrated in Fig. 3, in which, however, two independent spectroscopes or spectrographs are placed one beside the other. The system comprises a collimating slot 40, lenses 41 and 42, a prism 43, an eye piece having a slot 44, lenses 45 and 46, a prism 47, and a system for reflecting the desired portion of the spectrum. As shown in the figures the reflecting system comprises two reflecting mirrors 48 and 49 and a diaphragm 50 provided with a slot. The spectrum produced by the spectroscope 40—43 is similar to the one shown in Figs. 3 and 4, and it is reflected so that the rays of the spectrum are focussed in the slot of the diaphragm 50.

The paths of the rays have been indicated in the figures, and the selecting of the desired rays will be understood without further explanation.

While in the example shown in Figs. 6 and 7 the prisms 43 and 47 are disposed with their edges in alignment, Fig. 8 shows a modification in which the said prisms are disposed with their edges parallel. The first spectroscope I comprises a collimating slot 55, lenses 56 and 57, and a prism 58, while the second spectroscope II comprises a slot 59, lenses 60 and 61 and a prism 62. Assuming the reflecting system to be described hereafter to be omitted, the spectrum of the spectroscope I is produced on the line 63—64—65, and when using the slot 59 of the second spectroscope II as a collimating slot, the spectrum of the said second spectroscope would be produced on the line 66—67—68. By means of the lenses 57 and 61 and mirrors 70 and 71 the said spectra are made to coincide in a slot made in a diaphragm 72. The reflecting system consisting of the mirrors 70 and 71 and the diaphragm 72 is adapted to be shifted according to the position of the spectra.

In the construction shown in Figs. 1 and 2 it is necessary to turn the mirror 12 according to its position within the spectrum 8—10—9, in order to reflect the rays in the proper direction. Fig. 9 shows a modification in which such turning of the mirror is not necessary. While in Figs. 1 and 2 both spectroscopes are located at the same side of the spectrum, the spectroscopes I and II shown in Fig. 9 are symmetrically disposed at opposite sides of the spectrum.

The spectroscope I shown in Fig. 9 consists of a collimating slot 73, a pair of nonachromatic lenses 74 and 75, for example quartz lenses, and a prism 76, and the spectroscope II consists of a slot 77, lenses 78 and 79 and a prism 80. Assuming both slots 73 and 77 to be used as collimating slots of the spectroscopes, the spectra of both spectroscopes nearly coincide on the line 81—82—83. Thus, for reflecting the rays of the spectrum produced by the spectroscope I a mirror 85 is provided which is movable along the said line 81—82—83, the said mirror being always perpendicular to said line.

Preferably, for obtaining better images, the lenses 75 and 79 are not fixed in position, but they are rockably mounted so that their axes always intersect the portion of the spectrum to be selected. Therefore they are mounted on arms having their fulcrum substantially in the points P, P', in which the normal rays leaving the prism 76 or impinging upon the prism 80 intersect. Preferably, the said arms are connected with the mechanism for moving the mirror 85, so that the lenses are automatically rocked into the proper position. The construction of the mechanism for moving the slide and the lenses 75 and 79 will be described hereinafter.

So far it has been assumed that the spectra of both spectroscopes coincide, and ordinarily the slight deviation of the curved spectra can be neglected. However, where very exact measurements are desired, the mirror 85 is moved along the curved spectrum of the spectroscope II while slightly turning the same so as to reflect the rays through the second prism 80. Simultaneously the refracting means such as the prism can be turned into the minimum positions corresponding to the positions of the mirrors, or the collimating lenses 74 and 78 can be set in focusing positions.

In Fig. 10 I have shown a modification which is similar to the one illustrated in Fig. 9 in so far as both sections I and II of the instrument are located at opposite sides of the spectrum. However, one of the dispersions of the pencil of rays is not effected by means of a spectroscope, but by means of a system of non-achromatic lenses. For some portions of the spectrum of certain wave lengths only two system of non-achromatic lenses may thus be combined, and in this case as well as in other cases the reflecting means may be in the form of reflecting means of selective reflection.

The section I of the system comprises a source of light or a slot 90, and a non-achromatic lens system 91 having good monochromatic reproduction. The images of the slot 90 are produced different distances away from the lenses 91, according to the length of the waves of the colors. The section II of the system comprises a slot 92, lenses 93 and 94, and a prism 95. When assuming the slot 92 to be the collimating slot of the spectroscope, the spectrum would be produced on the line 96—97. The system 90, 91 is mounted on arms 98 rockingly mounted on an axis intersecting the source of light or slot 90. Preferably, the said arms are connected with the mechanism for shifting the mirror 99 along the line 96—97. As shown in the figure, the lens 94 is mounted on an arm 100 rockingly mounted at $P^{10}$ and connected with the mechanism for shifting the mirror 99.

In order that the rays thrown by means of the system 90, 91 on the mirror 99 be as far as possible free of foreign rays I prefer to provide a shutter 89 for covering the central rays passing through the lenses 91.

By means of the system illustrated in Fig. 10 the rays are purified by being twice separated into rays of equal wave length. Further, the system is very effective because all the rays of the desired wave length are thrown on the mirror 99 and reflected thereby through the spectroscope II.

In the example shown in Fig. 10 the rays are first passed through the system of lenses 91, and thereafter through the spectroscope II. But I wish it to be understod that I do not limit myself to this feature, and that the rays may be passed first through the spectroscope II, and thereafter through the lenses 91.

In Fig. 11 I have shown a modification in which half prisms 110 and 111 having reflecting faces 112, 113 are provided. Thus, the common spectrum of both parts I and II of the system is located between the prisms and the source of light and eye piece of the parts I and II. Preferably, the reflecting faces 112 and 113 are in the form of concave mirrors having the function of the lenses used in the examples so far described, or they consist of Fery prisms having curved front and rear faces 112' and 112'', as is shown in Fig. 11$^a$.

The part I of the system comprises a source of light 114, a lens 115, and a collimating slot 116, the said parts being included in a tube 117 provided with shutters 118. Further the half prism 111 forms a part of the apparatus I. By the said parts a spectrum is produced on the line 120—121. The second apparatus II comprises the half prism 110, a slot 122 and shades 123, and the spectrum produced by the said parts when using the same as a spectroscope coincides with the spectrum 120—121. At the rear of the slot 122 I have indicated an instrument 124 such as a thermo-electric couple adapted to be illuminated by the pencil of rays selected by the system.

The reflecting surfaces 112 and 113 are preferably coated with magnesium, aluminium, silicon, beryllium, or alloys containing one or more of the said substances, which may be applied to the prisms by vaporization or atomization, and which are covered by means of a protective coating or plate, the said materials being valuable by reason of their high reflecting property for ultra-violet rays.

An important feature of my invention resides in that under certain circumstances the dispersions of the successive spectroscopes are added to each other, the second spectroscope II further dispersing the selected rays, while in other cases the said dispersions are compensated, so that the said selected rays are collected by the second spectroscope. This feature is important for the reason that within the sections of the spectrum of small dispersion and comparatively high intensity, a double dispersion is ordinarily desirable, while within the field of great dispersion and small intensity, that is within the field of the ultra-violet rays, it is preferred to collect the selected pencil of rays, the said rays being merely purified by the second spectroscope.

In order to permit the same instrument to be used either for double dispersion and purifying of the rays, or merely for single dispersion and purifying of the rays, I prefer to construct all the apparatus so that they may be made suitable at will for both purposes.

For explaining the matter, reference will be made to the construction of the apparatus shown in Fig. 9, which construction has been shown again in Fig. 12. At first sight it might be assumed that by reason of the symmetric construction of both spectroscopes the portion of the spectrum selected by one mirror 12 is again collected into a pencil of mixed rays, and that therefore the rays are only purified without being further dispered.

By the first spectroscope I the blue and red portions of the spectrum are produced at $b$ and $r$. But the selected rays passing through the second spectroscope II do not emanate from the said points $b$ and $r$, but from the images $b'$ and $r'$ of the said points, which images are reversed in position relatively to the points $b$ and $r$. Therefore, the image of the blue portion of the spectrum is located farther away from the spectroscope II than the image of the red portion. Thus the said rays cannot be collected, but they are further dispersed.

It will be readily understood that when providing two successive reflecting surfaces the reverse position of the images of the collimating slot is again corrected, and that therefore, when providing two mirrors, the dispersion of the selected rays is again compensated, and that the said rays are subjected only to double purification. Generally speaking, when providing an even number of mirrors, the dispersion will be compensated, while with an uneven number of mirrors dispersion will not be compensated. Further, it will be understood that such reversing of the rays is not only produced by providing the additional mirrors in connection with the movable slot, but that the said mirror or mirrors may be provided at other parts of the system. Further, other reversing means such as refraction or means for producing intermediate images may be provided. Further, I have found that by providing a certain number of mirrors the curved form of the spectral lines produced by the collimating slot is compensated, the curved spectral lines of the first spectroscope being made to coincide with the spectral image of the second spectroscope. The same result may be obtained by providing a curved slot through which the selected portion of the spectrum is reflected to the second spectroscope. The reflecting system may be provided with curved reflecting surfaces, or it may be combined with refracting means, for example in order to correct displacements of the rays or astigmatic images, or to concentrate the rays by cylindrical curves.

For further illustrating the principle of dispersion, reference will now be made to some of the examples described above.

In the construction shown in Figs. 1 and 2 a single mirror 12 is provided. Therefore, the second spectrum adds to the dispersion of the pencil of rays. If it is desired to prevent double dispersion, a narrow roof edge mirror is provided in the manner similar to Fig. 5 in lieu of the mirror 12. If on the other hand in the examples shown in Figs. 5, 6 and 8 having no additional dispersion of the selected pencil of rays such dispersion is desired, suitable means are provided for reversing the relative position of the image of the collimating slot produced in the spectrum, for which purpose the mirror shown in Fig. 13 is provided in lieu of the reflecting surfaces 29, 30 or 48, 49 or 70, 71 respectively, which mirror comprises three reflecting surfaces 130, 131, 132 disposed at angles of 120°. Within the said mirror the rays are selected by means of a shiftable shutter 109.

In lieu of the mirror shown in Fig. 13 having three reflecting faces a system of two mirrors can be used in which one of the mirrors is in the form of a roof angle mirror or a similar double mirror. If it is desired by such a substitution of mirrors to provide for a rapid rearrangement of the system from single dispersion to double dispersion of the pencil of rays, it must be taken into consideration that in some cases by such a variation of the path of the rays, for example by inserting a roof angle prism in lieu of a simple mirror or using other optical material, the distance of the image can be reduced as compared to the other section of the apparatus. This displacement of one of the spectra can be compensated by inserting intermediate optical elements or in the manner shown in Fig. 6$^a$, when leaving the main parts of the system in their normal positions, by providing, in lieu of the single reflecting surfaces 48, 49 shown in Fig. 6, a combination of mirrors in which the reflecting surface 48 is replaced by a roof angle prism 48', as is shown in Fig. 6$^a$. Thereby both mirrors are shifted towards the prisms of the spectroscopes so far that the images of the collimating slot are not produced on the line 50 but on the line 50', which line is the one on which the images of the slot 44 are produced.

Other examples of reversing the relative position of the image of the collimating slot consist in providing a system for producing an intermediate optical image, or turning one section of the system at an angle of 180°.

In a similar way, in the construction shown in Fig. 12 the mirror 85 cannot be directly replaced by a system comprising two mirrors of constant angular position, and it would be necessary, when shifting the system or mirrors through the spectrum, either to vary the angular position of the mirrors according to the varying inclination of the selected rays, or to vary the relative position of the mirrors.

In Fig. 14 I have shown a construction in which the said variation of the angular position of the mirrors is not necessary, the reflection of the rays being combined with a deflection depending on the wave lengths of the rays, the system comprising a prism at each side adapted to compensate the different angles of the rays of the spectrum. For this purpose small prisms might be disposed in front of the mirrors, the said prisms having such coefficients as to correct the rays in accordance with the wave lengths. In Fig. 14 such prisms have been shown combined with the reflecting surfaces. In the said figure the spectrum is produced on a plane represented by the line 135—136. The letters $b$ and $r$ indicate two rays of different wave lengths (blue and red) coming from the prism of the first spectrograph, the ray $b$ intersecting the line 135—136 at a larger angle than the ray $r$. The selecting system comprises a slotted diaphragm 137 and a pair of prisms 138 and 139, the said system being adapted to be shifted along the line 135—136. The prisms 138 and 139 comprise each a reflecting surface 140, a surface 141 located at the side of the spectroscopes, and a surface 142 located at the side away from the spectroscopes. The ray $r$ impinging upon the surface 141 is refracted outwardly and towards the reflecting surface 140, and it is reflected thereby, preferably by total reflection, towards the surface 142, and when leaving the prism it is again refracted into a direction for passing through the slot of the diaphragm 137. The path of the ray through the prism 138 is similar. The dimensions of the prisms 138 and 139, the material from which they are made, and their positions relatively to the line 135—136 are such that the rays constituting the pencil $r$ intersect within the slot 137. By reason of the symmetrical disposition of both prisms 138 and 139 the path of the rays through the prism 138 and towards the prism of the second spectroscope is the same as that within the prism 139.

If the prisms 138 and 139 are made from a material similar as to dispersion to the material from which the prisms or lenses of the spectroscopes I and II are made, and if the prisms are made with proper angles, the deflection of the ray is the same for all the rays of different wave lengths, and therefore for all the positions of the slot 137 within the spectrum.

In Fig. 15 I have shown a modification in which the spectroscopes and the prisms 145 and 146 are disposed so that the rays of the spectroscopes cross each other before impinging upon the prisms 145 and 146. Otherwise the construction is similar to the one shown in Fig. 14, and it will be understood without further explanation.

As is known to those skilled in the art, ordinarily the portions of the spectrum of great wave lengths have smaller dispersion as compared to the portions of small wave lengths. Therefore, when using selecting mirrors or slots of even breadth or systems of mirrors in which the slots have even breadth for selecting rays of great lengths and rays of small lengths, the pencil of rays of great wave lengths includes rays the wave lengths of which are different in a higher degree than the wave lengths of rays of short wave lengths. In order to combine, in both cases, rays in which the differences between the greatest and smallest wave lengths are alike I make use of the mirror shown in Fig. 16. As shown in the said figure, the mirror 150 is narrower at its top than at its bottom, and it is shiftable on a guide way 151 which is inclined downwardly relatively to the horizontal spectrum 81, 82, 83 shown for example in Fig. 9 from the left to the right. Thus when shifting the mirror on the said guide way into position for reflecting the rays 81 of short wave lengths, the broad basis of the mirror is in position for reflecting the rays, and when setting the mirror into position for reflecting the rays 83 of great wave lengths and small dispersion, the upper narrow portion of the mirror is in reflecting position.

In the modification shown in Fig. 16ª the mirror 150' is curved and slightly twisted so that the reflecting portions of the reflecting surface are moved exactly along the slightly curved spectrum of the second spectrograph. Thereby the selection and collection of the rays are improved.

In such cases in which slots are used for selecting portions of the spectrum, as is shown in Figs. 6 and 7, the said slots are made different in width according to the degree of dispersion of the rays of the different wave length, or the diaphragms are made in two parts adapted to be set different distances away from each other for varying the width of the slot.

Mirrors having inclined guide ways and twisted reflecting surfaces may further be used in double spectral apparatus in which the spectra of the said spectral apparatus are in corresponding positions in longitudinal direction, in which, however, the relative angular dispersion is different in a manner indicated in Fig. 17, because in such unsymmetric combinations the active portion of the reflecting surface passing through the spectrum must continuously change the angular position of its reflecting surface.

For regulating the spectral intensity transmitted through the reflecting system means may be provided for varying the height of the selected pencil of rays, which means may be for example in the form of a movable or fixed transverse shade of variable height.

In the examples so far described a continuous part of the spectrum is selected. By subdividing the effective selecting slot, several adjacent but separate parts of the spectrum may be transmitted by means of one reflecting system.

Instead of providing only one system of mirrors for selecting the desired rays from the spectrum, a plurality of such systems may be provided which are coupled with one another and which are movable longitudinally of the spectrum. Further, measuring apparatus may be provided which are shiftable longitudinally of the spectrum. Such apparatus may be used for example for mixing several portions of the spectrum within the eye piece, or simultaneously directing the same to different measuring or testing apparatus.

In Fig. 6$^b$ I have illustrated a portion of Fig. 6 showing two reflecting systems 48$^2$, 49$^2$ and 48$^3$, 49$^3$ which reflecting systems are located in different portions of the spectrum and are adapted to reflect pencils of rays of different wave lengths through the same prism 47, which pencils are combined in the slot 44.

In the foregoing examples prisms have been referred to for refracting the pencils of rays. But I wish it to be understood that my invention is not limited to the use of prisms, and that other means may be provided, such for example as deflecting, interfering or polarizing means such as refraction ratings or interference apparatus, or combinations of such means. By means of such apparatus spectra of a plurality of orders are obtained one beside the other or one above the other, from which portions can be further transmitted or separated.

By providing a plurality of coupled reflecting systems in connection with the said apparatus analogous portions of the different partial spectra can be again combined into a selected spectral image of particularly high light intensity, if desired in continuous succession, in which case under proper conditions sharp interference can be obtained.

Also in spectral apparatus comprising achromatic lenses, or in spectrometers in which the spectra are produced by catoptric means, the aforesaid principle of double dispersion or purification can be used.

In the foregoing I have described the relation between the different parts of the spectroscopes, and it is my opinion that any one skilled in the art will be able to mount the different parts of the apparatus in the manner described herein. However, for clearness sake I shall now describe a few examples of mounting the spectroscopes.

In Figs. 18 and 19 I have illustrated the manner of mounting an apparatus such as has been shown in Fig. 9. As shown in the said figures, the collimating slot 73, the lenses 74 and 75, and the prism 76 are mounted on a table 160. At the right hand end of the said table a slide 161 is mounted in a guide way 162, and it is adapted to be shifted within the said guide way by means of a screw 163 provided with a handle 164 and mounted in lugs 165. On the said slide 161 there is a block 166 adapted to have a mirror 85 or a mirror of the construction shown in Fig. 13 mounted thereon. Thus by operating the screw 163 the slide 161 and the mirror carried thereby are shifted longitudinally of the table 160 and with the mirror 85 passing through the spectrum from the portion of great wave length to the portion of small wave length. The lens 75 is mounted on a slide 167 movable in a transverse curved guide 168. For moving the lens 75 transversely of the table 160 a rod 170 is provided which is rockingly mounted at 171 at the point of intersection of the rays coming from the prism 76 and forming the spectrum, and the said rod is passed through a bore made in the slide 167 and through an eye carried by the slide 161. Thus when shifting the slide 161 the rod 170 is rocked so as to move the lens 75 into the position in which the rays impinging upon the mirror 85 pass through the center of the lens. A similar construction is provided for guiding the lens 79 relatively to the mirrow 85, and in Fig. 18 I have indicated the rod 172 connecting the slide carrying the lens 79 with the slide 161.

The manner of mounting the system shown in Fig. 10 is similar to the one described with reference to Figs. 18 and 19.

In Figs. 20 and 21 I have shown the manner of mounting the system shown in Figs. 6 and 7. The left hand part of the system including the prisms 43, 47, the lenses 41, 45 and the slots 40, 44 is mounted on a table 180. The right hand part 181 of the said table is formed with an elongated window 182 located in the position where the spectrum is formed. On the board 181 a slide 183 is shiftable from the position shown in full lines into the position shown in dotted lines, and the said slide carries the reflecting system comprising the slotted diaphragm 50 and the mirrors 48, 49, the said parts being mounted on shelves 184 projecting from the slide 183 to opposite sides. Suitable means are provided for guiding the slide 183 on the board 181. As has been described above the slot 50 and the mirrors 48 and 49 must be shifted through the spectrum and therefore longitudinally of the slot 182, and simultaneously the system must be turned at a certain angle for correctly reflecting the rays coming from the first prism through the slot and to the second prism. Suitable means are provided for thus shifting and turning the slide 183. To show what may be done, two guide ways 185 and 186 are provided on the board 181, and the slide 183 is guided in the said guide ways by means of two balls or rollers 187 and 188, the said balls or rollers being held in recesses 189 made in the slide 183. Further, for holding the slide in the proper position, a ball 191 is provided in a recess 192, the said ball being movable on the face of the board 181. To the slide 183 an arm 195 is fixed, which projects through the window 182 of the board 181 and is bent laterally thus providing an elastic seat for a ball 196 embedded in a recess of the lateral part of the arm 195 and sliding on the board 181, the object of the arm 195 and the ball 196 being elastically to press the slide 183 towards the board 181. The guide ways 185 and 186 are curved and inclined relatively to each other, so that the slide 183 and the slot 50 follow the curvature of the spectrum and are turned through the proper angle when shifting the same longitudinally of the window 182. In the example shown in the figures the guide ways 185 and 186 are in the form of grooves made in the board 181.

In the example shown in Fig. 20 the edges of the refracting prisms are vertical and the curves 185 and 186 of the guide way of the slide 183 are disposed in horizontal planes. But I wish it to be understood that the system may be turned at an angle of 90 degrees so that the refracting edges of the prisms are horizontal and the guide ways of the balls or rollers of the slide 183 are disposed in vertical planes.

In Figs. 22 and 23 I have shown a modification of my improved system in which the apparatus for dispersing the rays and purifying the selected pencil are in the form of Young's spectroscopes. A spectroscope of this type comprises two half prisms 201 and 202 disposed with their hypothenuses facing each other and capable of being rocked about an axis 203 coinciding with the line of intersection of the said hypothenuses. Each half prism is mounted in a tube 204 and 205 respectively, and the catheti of the prisms are perpendicular to the axes of the said tubes. Each tube includes a lens 206, 207. The tube 204 is provided with a collimating slot 208, and at the end of the tube 205 there is a mirror 209, the said mirror being adapted to reflect the rays towards a mirror 210 forming a part of the second spectroscopic apparatus composed of tubes 204', 205', prisms 201', 202', and lenses 206', 207'. The said prisms 201', 202' and lenses 206', 207' are similar in form and relative position to the prisms 201, 202 and lenses 206, 207, and the axis 203' of the prisms 201', 202' is in alignment with the axis 203 of the prisms 201, 202. Between the mirrors 209 and 210 there is a slotted diaphragm 211.

For selecting a pencil of rays of the desired wave length the rays emanating from a source of light 212 are passed through the collimating slot 208, the lens 206 and the prism 201, and the tube 205 is set in the position in which the pencil of rays of the desired wave length passes axially through the tube 205. Simultaneously the lenses are set at such distances away from the slots that the pencil of rays axially passing through the instrument produces a sharp image of the slots 208, 208' on the intermediate slot 211. For thus shifting the lenses mechanism controlled by cam grooves may be provided. The rays are reflected by the mirrors 209 and 210, and the desired pencil of rays is selected by means of the slotted diaphragm 211. Finally, the pencil of rays is purified in the manner described above by passing through the second spectroscope comprising the tubes 204' and 205', the said tubes being disposed relatively to each other at the same angle as the tubes 204 and 205.

From the foregoing description it will be understood that the half prisms the optical axes of which coincide with the axes of the tubes are always traversed by the rays to be examined at the most favorable angles. Further, the half prisms can be made from comparatively small pieces of refracting material, which is particularly important when manufacturing the said prisms from quartz.

In Figs. 24 and 25 I have shown a system similar to the one shown in Figs. 22 and 23, in which however the construction of the Young spectroscopes has been modified. I wish it to be understood that the modification of the construction of the Young spectroscope is novel independently of the use of the spectroscope in connection with the system for selecting purified pencils of rays descriped herein.

Instead of providing a single lens 206, 207 for each prism 201, 202, I provide combinations of plano-convex lenses 215—216, 217—218 and 215'—216', 217'—218', the said combination of lenses being disposed with their convex faces facing each other. Thus the plane faces of the lenses 215, 217, 215', 217' are at the sides of the catheti of the prisms 220, 221, 220', 221', and I am enabled to cement the said lenses to the prisms or to make the same integral therewith by providing the prisms with convex end faces, as is shown in Fig. 26. The diameter of the outer lenses 216, 218, 216', 218' may be smaller than that of the inner lenses 215, 217, 215', 217'. By providing two lenses at each side of the prisms, the path of the rays is considerably improved, and the ratio between the diameter of the prisms and the focal length of the lens systems is comparatively large. Further, the chromatic aberration is reduced as compared to systems in which single lenses are provided at each side of the prisms.

In Fig. 27 I have shown a modification in which in lieu of the mirrors 209 and 210 reflecting prisms 225 and 226 are provided, and the faces of the prisms provided by the catheti of the triangle are curved for further improving the path of the rays. Further, the prism 225 is combined with a roof angle prism 227 which may be placed into the path of the rays in lieu of the prism 225 for reversing the rays in the manner described above. Preferably, the prisms 225 and 227 are combined into a single body adapted to be rotated about an axis parallel to the edges of the prisms for setting either one of the prisms into reflecting position.

In Figs. 28 and 29 I have shown another modification in which the outer lenses 230 and 231 located at the side of the mirrors are combined with the prisms 232 and 233 by being cemented thereto or made integral therewith. The inner lenses 234 and 235 are cemented to or made integral with the prisms 236, 237. Thus, the number of the end faces of the optical members is reduced to a minimum.

In the modification shown in Fig. 30 the reflecting prisms 238 and 239 are located at the rear of the foci 240 and 240' of the spectroscopes, in which foci the spectra are produced, and the prisms 238 and 239 are formed with convex faces 241, 242. Thus an image of the spectrum produced at 240 is made in the slotted diaphragm 243, and an image of the selected portion of the said spectrum is made at 240', which image is further passed through the second spectroscope II.

In the modification shown in Fig. 31 the source of light 244 and the collimating slot 245, and further, the slotted diaphragm 246 through which the purified pencil of rays is examined, are located laterally of the axes of the spectroscopes, prisms 247 and 248 being provided for deflecting the rays. Preferably, the said prisms are combined with the outer lenses 249 and 249'.

An important feature of the apparatus described above resides in that spectral photographs can be taken at the end slots of the systems, and that the sections of the system can be directly used for taking spectral photographs, in which case the system of mirrors is shifted out of the spectrum. Further, comparative spectral photographs can be taken, by using both sections of the apparatus as spectrographs, the slot provided at the eye piece of the second spectrograph being used as a collimating slot, so that by the said second section a spectrum is produced which coincides with the spectrum of the first section of the system. The collomating slots of the apparatus are now reduced in length, say to one half of the ordinary length, so that the images are produced in the spectrum one above the other. In connection with this system scale marks for indicating wave lengths can be provided.

Further, within the paths of the rays polarizing or interfering effects can be produced, by providing suitable polarization or interference elements such for example as are used in the spectral photometers of König. Further, the two sections of the apparatus can be used as comparative spectral photometers, by disposing the eye piece of the photometer or measuring instrument within the common spectrum.

It will be understood that my method may be further developed by directing the rays passing through the pair of apparatus forming the system through similar apparatus, as may be desirable for example for increasing the dispersion of the pencil.

In the claims reference has been made to apparatus disposed one beside the other, and I wish it to be understood that this term includes apparatus located one above the other. Further, where reference is made in the claims to a spectrum produced by an apparatus, the said claims are understood to include systems in which a plurality of spectra are produced.

In the foregoing specification certain subsidiary means to be used in connection with certain systems have been described, and I wish it to be understood that the said means may be used in connection with all the systems. For example, the means for varying the breadth of the selected pencil of rays illustrated in Figs. 16 and 16ª may be used in connection with the system shown in Figs. 6 and 7. Further, in the said system the breadth of the pencil of rays may be varied, either by disposing the parts of the diaphragm at a greater or smaller distance, or by providing a slot which is gradually reduced in width from one end to the other.

Further, the said principle may be used in connection with any wave lengths, for example with the methods of the Röntgen or radio spectroscopy, or in connection with heat waves of great length and electrical waves.

I claim:

1. A system of the class described, comprising a pair of apparatus capable of dispersing pencils of rays and disposed one beside the other, and reflecting means for directing a portion of the spectrum produced by one of said apparatus through the other one.

2. A system of the class described, compressing a pair of apparatus capable of dispersing pencils of rays and disposed one beside the other, and reflecting means for directing a portion of the spectrum produced by one of said apparatus through the other one, said pair of appartaus being constructed and positioned relatively to each other so that the differences of the distances of the images forming the spectra and produced by rays of corresponding wave lengths are substantially alike.

3. A system of the class described, comprising a pair of apparatus capable of dispersing pencils of rays and disposed one beside the other, and reflecting means for directing a portion of the spectrum produced by one of said apparatus through the other one, said apparatus and reflecting means being constructed and disposed relatively to one another so that the spectra produced by the said apparatus substantially coincide.

4. A system of the class described, comprising a pair of apparatus capable of dispersing pencils of rays and disposed one beside the other, and reflecting means for directing a portion of the spectrum produced by one of said apparatus through the other one, said apparatus being located at opposite sides of the spectra produced thereby.

5. A system of the class described, comprising a pair of apparatus capable of dispersing pencils of rays and disposed one beside the other, and reflecting means variable in effective area for selecting a portion of the spectrum produced by one of said apparatus and directing the same through the other one.

6. A system of the class described, comprising a pair of apparatus capable of dispersing pencils of rays and disposed one beside the other, reflecting means for selecting a portion of the spectrum produced by one of said apparatus and directing the same through the other one, the selecting area of said reflecting means comprising portions different in width, and means for setting said reflecting means with any of said different portions in selecting position.

7. A system of the class described, comprising a pair of apparatus capable of dispersing pencils of rays and disposed one beside the other, and means made from a material having high reflecting property for ultra-violet rays for directing a portion of the spectrum produced by one of said apparatus through the other one.

8. A system of the class described, comprising a pair of apparatus capable of dispersing pencils of rays and disposed one beside the other, means made from a material having high reflecting property for ultra-violet rays for directing a portion of the spectrum produced by one of said apparatus through the other one, and a protective covering for said reflecting material.

9. A system of the class described, comprising a pair of apparatus capable of dispersing pencils of rays and disposed one beside the other, and reflecting means for simultaneously directing a plurality of portions of the spectrum or spectra produced by one of said apparatus through the other one.

10. A system of the class described, comprising a pair of apparatus capable of dispersing pencils of rays and disposed one beside the other, reflecting means for directing a portion of the spectrum produced by one of said apparatus through the other one, said reflecting means being mounted for being removed out of reflecting position, and means adapted to be placed in position for examining portions of said spectra.

11. A system of the class described, comprising a pair of apparatus capable of dispersing pencils of rays and disposed one beside the other, reflecting means for directing a portion of the spectrum produced by one of said apparatus through the other one, said reflecting means being mounted for being removed out of reflecting position, and means adapted to be placed in position for making photographs of the spectra.

12. A system of the class described, comprising a pair of apparatus capable of dispersing pencils of rays and disposed one beside the other, and a reflecting system comprising a set of reflectors adapted to direct the same from one of said apparatus to the other one and a selecting member adapted to select portions of the spectrum.

13. A system of the class described, comprising a pair of apparatus capable of dispersing pencils of rays and disposed one beside the other, and a reflecting system comprising a set of reflectors adapted to direct the rays from one of said apparatus in transverse direction and to the other one and a selecting member adapted to select a portion of the spectrum.

14. A system of the class described, comprising a pair of apparatus capable of dispersing pencils of rays and disposed one beside the other, and means for reflecting a portion of the spectrum produced by one of said apparatus through the other one and reversing the relative position of the rays passing through said apparatus.

15. A system of the class described, comprising a pair of apparatus capable of dispersing pencils of rays and disposed one beside the other, and reflecting means for directing a portion of the spectrum produced by one of said apparatus through the other one, said reflecting means being constructed so as to reverse the relative position of the rays.

16. A system of the class described, comprising a pair of apparatus capable of dispersing pencils of rays and disposed one beside the other, and reflecting means for directing a portion of the spectrum produced by one of said apparatus through the other one, said reflecting means comprising exchangeable members one permitting the rays to pass without reversion and the other reversing the same.

17. A system of the class described, comprising a pair of apparatus capable of dispersing pencils of rays and disposed one beside the other, and a reflecting system comprising a set of reflectors adapted to direct the rays from one of said apparatus to the other one and a selecting member adapted to select a portion of the spectrum, said set of reflectors being variable from an even number of reflecting surfaces to an uneven number of reflecting surfaces.

18. A system of the class described, comprising a pair of apparatus capable of dispersing pencils of optical rays and disposed one beside the other, reflecting means for directing a portion of the spectrum produced by one of said apparatus through the other one, and means for investigating portions of the spectrum outside said reflecting means.

19. A system of the class described, comprising a pair of apparatus capable of dispersing pencils of rays and disposed one beside the other, means for producing images, selecting and reflecting means for selecting a portion of the spectrum produced by one of said apparatus and directing the same through the other apparatus, means for moving said selecting and reflecting means through the said spectrum, and means for setting said image producing means in positions corresponding to the positions of said selecting and reflecting means.

20. A system of the class described, comprising a pair of apparatus capable of dispersing pencils of rays and disposed one beside the other, and reflecting means for directing a portion of the spectrum produced by one of said apparatus through the other one, said reflecting means being constructed so as to be capable of changing the optical image.

21. A system of the class described, comprising a pair of apparatus capable of dispersing pencils of rays and disposed one beside the other, reflecting means for directing a portion of the spectrum produced by one of said apparatus through the other one, and means for producing polarization or interference effects in the paths of the rays or for permitting comparative photometric tests.

22. A system of the class described, comprising a pair of apparatus capable of dispersing pencils of rays and disposed one beside the other, and reflecting means for directing a portion of the spectrum produced by one of said apparatus through the other one, each of said apparatus comprising a pair of prisms rockingly connected with each other on an axis coinciding with the line of intersection of the hypothenuses of the prisms.

23. A system of the class described, comprising a pair of apparatus capable of dispersing pencils of rays and disposed one beside the other, and reflecting means for directing a portion of the spectrum produced by one of said apparatus through the other one, each of said apparatus comprising a pair of prisms rockingly connected with each other on an axis coinciding with the line of intersection of the hypothenuses of the prisms and combinations of inner and outer lenses, the inner and outer lenses of each combination consisting of plano-convex lenses having their convex faces opposing each other.

24. A system of the class described, comprising a pair of apparatus capable of dispersing pencils of rays and disposed one beside the other, and reflecting means for directing a portion of the spectrum produced by one of said apparatus through the other one, each of said apparatus comprising a pair of prisms rockingly connected with each other on an axis coinciding with the line of intersection of the hypothenuses of the prisms and combinations of inner and outer lenses, the inner and outer lenses of each combination consisting of plano-convex lenses having their convex faces opposing each other, and the inner plano-convex lenses being combined with the prisms.

25. A system of the class described, comprising a pair of apparatus capable of dispersing pencils of rays and disposed one beside the other, and reflecting prisms for directing a portion of the spectrum produced by one of said apparatus through the other one, each of said apparatus comprising a pair of prisms rockingly connected with each other on an axis coinciding with the line of intersection of the hypothenuses of the prisms and combinations of inner and outer lenses, the inner and outer lenses of each combination consisting of plano-convex lenses having their convex faces opposing each other, the inner plano-convex lenses being combined with the prisms, and the outer plano-convex lenses located at the sides of said reflecting prisms being combined with said reflecting prisms.

26. A spectroscope, comprising two half prisms disposed with their hypothenuses facing each other and mounted for being rocked about an axis coinciding with the line of intersection of said hypothenuses, and pairs of plano-convex lenses located at opposite sides of said prisms and movable each pair with one of said prisms, said plano-convex lenses having their convex faces facing each other.

27. A spectroscope, comprising two half prisms disposed with their hypothenuses facing each other and mounted for being rocked about an axis coinciding with the line of intersection of said hypothenuses, and pairs of plano-convex lenses located at opposite sides of said prisms and movable each pair with one of said prisms, said plano-convex lenses having their convex faces facing each other, the inner plano-convex lenses being combined with the adjacent half prisms.

In testimony whereof I hereunto affix my signature.

CARL MÜLLER.